(12) United States Patent
McClure et al.

(10) Patent No.: US 6,470,860 B1
(45) Date of Patent: Oct. 29, 2002

(54) VAPOR BYPASS TUBE FOR A TANK

(75) Inventors: Daniel H McClure, Rochester Hills; Thomas J Large, Oxford; Raymond P Harrod, Rochester Hills; Henry W Harper, Milford, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/838,598

(22) Filed: Apr. 19, 2001

(51) Int. Cl.[7] ............................................... F02M 37/04
(52) U.S. Cl. .................... 123/516; 123/198 D; 137/74; 220/89.4
(58) Field of Search .................. 123/516, 198 D, 123/518, 519, 520, 521; 220/89.4; 137/72, 74

(56) References Cited

U.S. PATENT DOCUMENTS

| | | | |
|---|---|---|---|
| 1,973,182 A | * | 9/1934 | Shaw ........................ 220/89.4 |
| 3,465,912 A | * | 9/1969 | Fleming et al. ............. 220/89.4 |
| 4,796,777 A | * | 1/1989 | Keller ........................ 220/203 |
| 5,031,790 A | * | 7/1991 | Keller ...................... 220/203.2 |
| 5,111,837 A | * | 5/1992 | Morris et al. .................. 137/72 |
| 5,325,882 A | * | 7/1994 | Forsythe et al. ............... 137/73 |
| 5,577,740 A | * | 11/1996 | Purdom ........................ 277/26 |
| 6,176,205 B1 | * | 1/2001 | Smith ........................ 123/41.5 |

\* cited by examiner

*Primary Examiner*—Carl S. Miller
(74) *Attorney, Agent, or Firm*—Laura C. Hargitt

(57) ABSTRACT

A venting system for a tank in the form of a vapor bypass tube which is interfaced with a melt plug such that the bypass tube provides vapor pressure bypass of the melt plug hole. The vapor bypass tube has a first end mounted to the tank body circumscribably in relation to the melt plug. The vapor bypass tube has a second end, opposite the first end, which is open and located deep inside the tank. A vent aperture is provided in the vapor bypass tube adjacent the first end which provides vapor displacement from within the vapor bypass tube when the tank is being refueled.

7 Claims, 2 Drawing Sheets

VAPOR BYPASS TUBE FOR A TANK

TECHNICAL FIELD

The present invention relates to tanks equipped with a venting plug, and more particularly to a vapor bypass tube mounted to a fuel tank in cooperative relation to a venting pressure relief device.

BACKGROUND OF THE INVENTION

FIG. 1 depicts a typical application of a fuel tank 12 with respect to a truck tractor and semi-trailer rig 10. FIG. 2 is a detailed view of the fuel tank 12, which includes a tank body 14, a removable filler cap 16, and a melt plug 18, which is the prior art solution for providing a venting pressure relief device. As shown in FIG. 3, the melt plug is sealingly connected to the tank body 14, and is composed of a low melting point metal (lower than that of the metal of the tank body), such as for example a lead alloy installed at the top of the tank. In operation, heat will soften the melt plug, and increased pressure in the tank will cause it to be dislodged.

SUMMARY OF THE INVENTION

The present invention is a venting system for a fuel tank in the form of a vapor bypass tube which is interfaced with a pressure relief device (ie., a melt plug) such that the bypass tube provides vapor pressure bypass of the melt plug hole.

A fuel tank is provided with a pressure relief device integrated with respect to the tank. A vapor bypass tube has a first end sealingly mounted to the tank body circumscribably in relation to the pressure relief device. The vapor bypass tube has a second end, opposite the first end, which is open and located deep inside the tank. A vent aperture is provided in the vapor bypass tube adjacent the first end which provides vapor displacement from within the vapor bypass tube when the tank is being refueled.

In operation of the vapor bypass tube according to the present invention, in the event a fuel tank equipped therewith has fuel thereinside, is inverted, and the pressure relief device has been actuated (for example by the melt plug having dislodged), vapor above the fuel passes through the vapor bypass tube to thereby vent the tank so as to prevent vapor pressure build-up. On the other hand, if the tank remains upright and the pressure relief device is actuated, the vapor may easily vent through the vapor bypass tube in situations where the fuel level is below the second end of the vapor bypass tube vent; in situations where the fuel level is above the second end of the vapor bypass tube, the aperture will allow vapor to vent and fuel and/or vapor may be expelled through the vapor bypass tube.

DESCRIPTION OF THE PREFERRED EMBODIMENT

Figure 1:
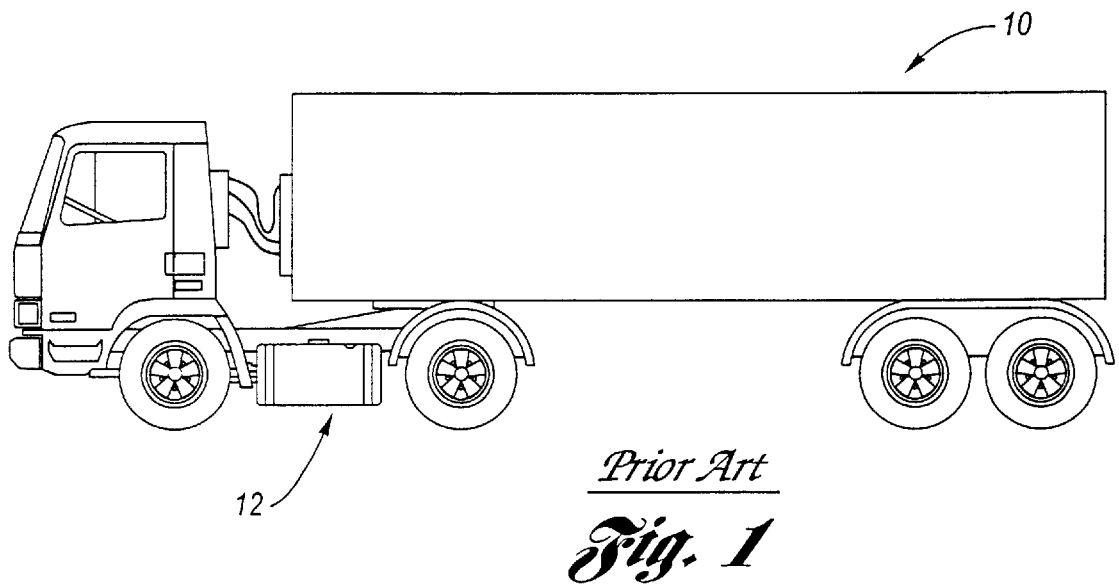
FIG. 1 is a side view of a truck tractor and semi-trailer rig having a fuel tank equipped with a conventional melt plug.
Figure 2:
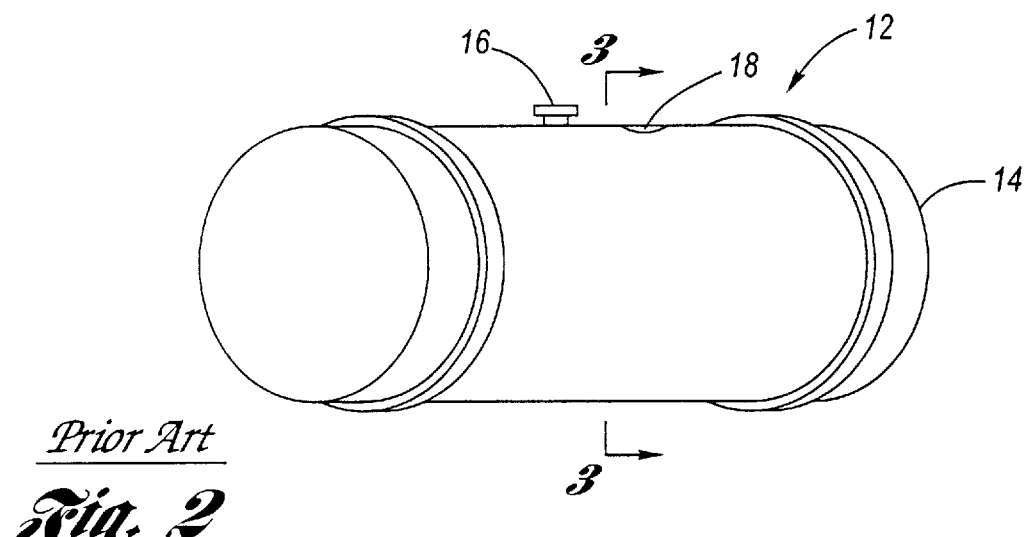
FIG. 2 is a perspective view of the fuel tank of FIG. 1.
Figure 3:
FIG. 3 is a sectional view taken along line 3—3 in FIG. 2.
Figure 4:
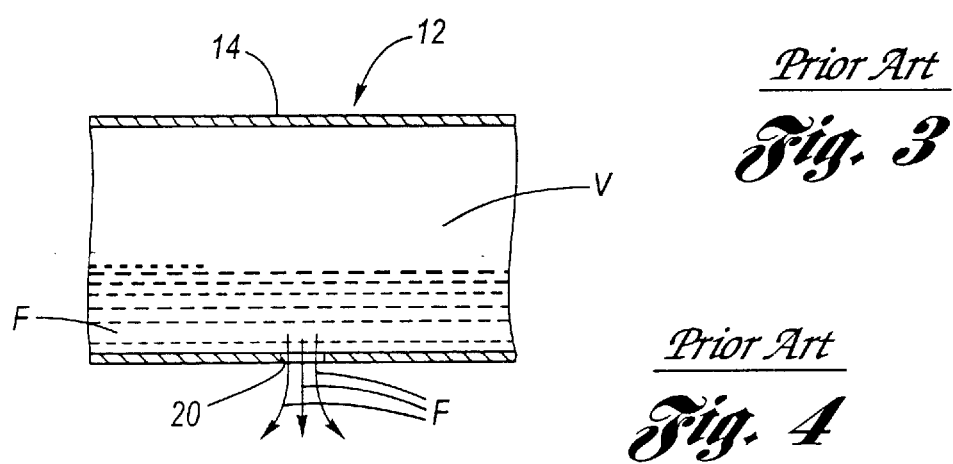
FIG. 4 is a partly sectional side view of the fuel tank of FIG. 2, shown inverted with the melt plug dislodged.

Referring now to the Drawing, FIGS. 5 through 8 depict the vapor bypass tube 104 according to the present invention.

A fuel tank (or any tank for holding a liquid subject to vapor pressure) 12 has a tank body 14, a filler cap 16, and a venting system 100 including a pressure relief device, as for example a melt plug 102, and a vapor bypass tube 104. The pressure relief device is generally conventional, as for example a melt plug 102 sealingly interfaced with the tank body 14 (see FIG. 6) and composed of a low melt temperature metal (low relative to the metal of the tank body), as for example a lead alloy.

The vapor bypass tube 104 according to the present invention has a first end 104a and an opposite second end 104b, wherein the first end is sealingly connected to the tank body 14 so as to circumscribe, preferably in concentric relation, the pressure relief device (ie., melt plug) and its hole 112 upon becoming dislodged from the tank body 14. The vapor bypass tube 104 is composed of a metal having a high melt temperature, similar to that of the tank body 14. The first end 104a of the vapor bypass tube 104 may be connected to the tank body by welding, brazing, soldering, etc. 108 or another affixment modality, as for example by welding, brazing soldering, etc. a flange connected to the first end to the tank body.

The second end 104b of the vapor bypass tube 104 is open. A vent aperture 110 is provided in the vapor bypass tube 104 adjacent the first end 104a. The vapor aperture 110 serves several functions: to allow vapor exiting from, and fuel entry into, the interior of the vapor bypass tube during refueling of the fuel tank and to allow vapor to escape the fuel tank 12 when the melt plug has dislodged and the tank is upright and filled with fuel.

The vapor bypass tube 104 has a length extending from the tank body at the melt plug to a location deep inside the fuel tank, for example about ⅔ the diameter of the fuel tank.

Figure 5:
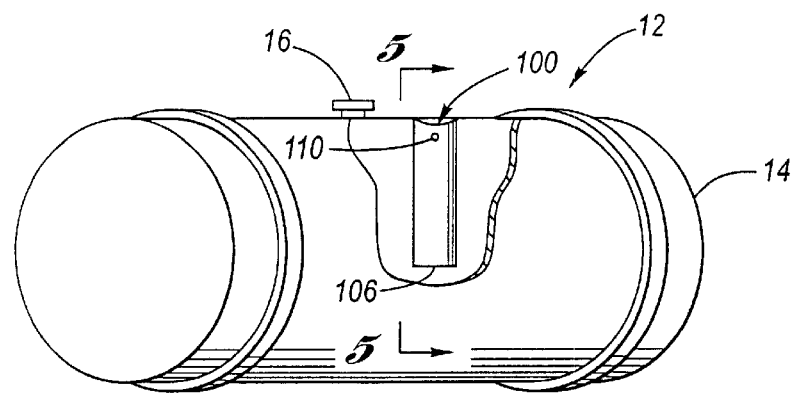
FIG. 5 is a perspective, partly broken-away view of a fuel tank similar to that of FIG. 2, now equipped with a vapor bypass tube according to the present invention.
Figure 6:
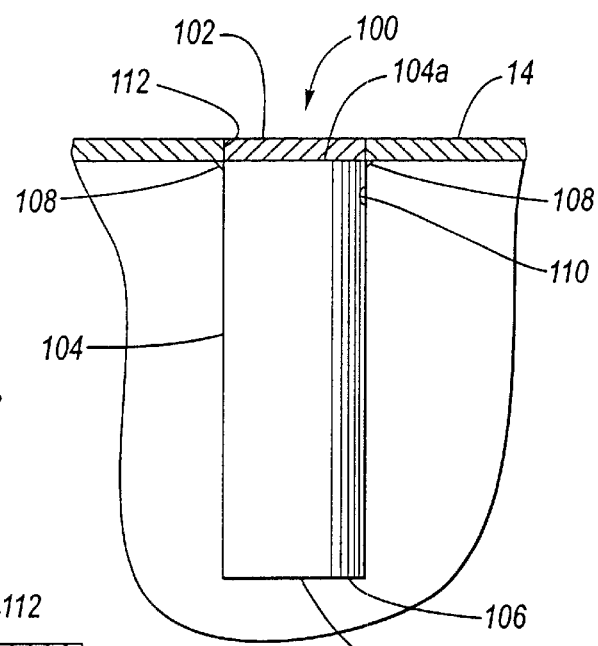
FIG. 6 is a sectional view seen along line 6—6 in FIG. 5.
Figure 7:
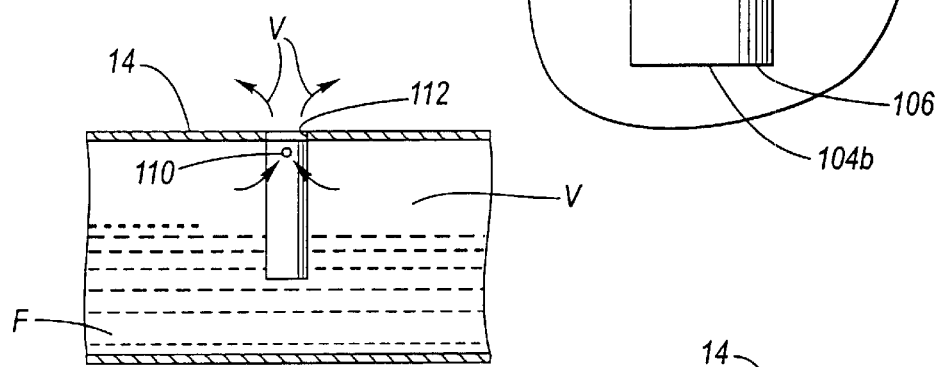
FIG. 7 is a partly sectional side view of the fuel tank of FIG. 5, shown upright with the melt plug dislodged.
Figure 8:
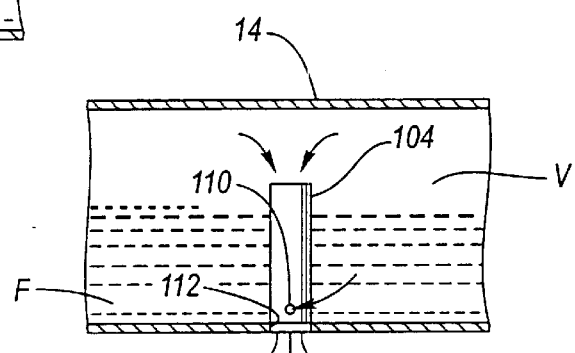
FIG. 8 is a partly sectional side view of the fuel tank of FIG. 5, shown inverted with the melt plug dislodged.

FIGS. 7 and 8 depict the venting system 100 of FIGS. 5 and 6 in operation with respect to a pressure relief device in the form of a melt plug.

In FIG. 7, the fuel tank is upright and the melt plug has become dislodged from the tank body 14 resulting in a melt plug hole 112 formed in the tank body. Fuel F fills the tank to a location above the second end of the vapor bypass tube 104. As pressure of the vapor V increases, it is exiting through the vent aperture 110 and out the melt plug hole 112. Excess vapor pressure may force fuel and/or vapor out through the vapor bypass tube.

In FIG. 8, the fuel tank is inverted and the melt plug has become dislodged from the tank body 14 resulting in a melt plug hole 112 formed in the tank body. Fuel F fills the tank to a location between the first and second ends of the vapor bypass tube 104. As pressure of the vapor V increases, it is exiting through the second end of the vapor bypass tube 104 and out the melt plug hole 112. Some fuel is exiting the fuel tank by bleeding through the vapor aperture 110, but the rate is much slower than if there was no vapor bypass tube present.

It is to be understood, that while the present invention has described in detail structural aspects relating to a fuel tank, that the vapor bypass tube according to the present invention may be used with any kind of tank in which vapor pressure can build-up thereinside.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A tank, comprising
   a tank body;
   a melt plug sealingly interfaced with said tank body, said melt plug having a melting temperature below that of said tank body; and
   a vapor bypass tube having a first end and an opposite second end, said first end being sealingly connected to said tank body so as to circumscribe said melt plug, wherein said second end is generally open;
   wherein said vapor bypass tube has a vent aperture formed therein generally adjacent said first end.

2. The tank of claim 1, wherein said vapor bypass tube is composed of a metal having a melting temperature higher than that of said melt plug.

3. A venting system for a tank, comprising:
   a tank body;
   a pressure relief device sealingly interfaced with said tank body; and
   a vapor bypass tube having a first end and an opposite second end, said first end being sealingly connected to said tank body so as to circumscribe said pressure relief device, wherein said second end is generally open and wherein said vapor bypass tube has a vent aperture formed therein generally adjacent said first end.

4. The system of claim 3, wherein said pressure relief device is a melt plug sealingly interfaced with said tank body, said melt plug having a melting temperature below that of said tank body.

5. The system of claim 4, wherein said vapor bypass tube is composed of a metal having a melting temperature higher than that of said melt plug.

6. In a tank having a tank body and a pressure relief device sealingly connected to said tank body, the improvement thereto comprising:
   a vapor bypass tube having a first end and an opposite second end, said first end being sealingly connected to said tank body so as to circumscribe said pressure relief device, wherein said second end is generally open and, wherein said vapor bypass tube has a vent aperture formed therein generally adjacent said first end.

7. The improvement of claim 6, wherein said pressure relief device is a melt plug; wherein vapor bypass tube is composed of a metal having a melting temperature higher than that of said melt plug.

* * * * *